United States Patent
Villalobos et al.

(10) Patent No.: US 9,569,339 B1
(45) Date of Patent: Feb. 14, 2017

(54) DEBUGGING IN AN ACTOR-BASED SYSTEM

(71) Applicant: Amazon Technologies, Inc., Seattle, WA (US)

(72) Inventors: Adam Julio Villalobos, Kirkland, WA (US); Martin Paul Zolnieryk, Seattle, WA (US); Andrew Kyle McWilliams, Kirkland, WA (US); Brian James Schuster, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/807,365

(22) Filed: Jul. 23, 2015

(51) Int. Cl.
 G06F 9/44 (2006.01)
 G06F 11/36 (2006.01)
 G06F 11/34 (2006.01)

(52) U.S. Cl.
 CPC ....... *G06F 11/3644* (2013.01); *G06F 11/3648* (2013.01); *G06F 11/3466* (2013.01); *G06F 11/3664* (2013.01); *G06F 11/3688* (2013.01)

(58) Field of Classification Search
 CPC .............. G06F 11/3688; G06F 11/3684; G06F 11/3466; G06F 2201/865; G06F 11/363
 See application file for complete search history.

(56) References Cited

U.S. PATENT DOCUMENTS

| | | | | |
|---|---|---|---|---|
| 7,185,319 B2* | 2/2007 | Kaler | ............. | G06F 11/362 717/124 |
| 8,069,435 B1* | 11/2011 | Lai | ............. | G06Q 10/10 717/106 |
| 8,887,138 B2* | 11/2014 | Eker | ............. | G06F 11/3664 717/119 |
| 9,116,767 B1* | 8/2015 | Arif | ............. | G06F 8/60 |
| 9,208,058 B2* | 12/2015 | Thukkaram | ............. | G06F 11/362 |
| 2003/0233634 A1* | 12/2003 | Carrez | ............. | G06F 11/3664 717/124 |
| 2004/0010778 A1* | 1/2004 | Kaler | ............. | G06F 11/362 717/130 |

(Continued)

OTHER PUBLICATIONS

Rusli et al., "A comparative evaluation of state-of-the-art web service composition testing approaches", ACM, AST'11, May 2011, pp. 29-35; <http://dl.acm.org/citation.cfm?id=1982602&CFID=678227648&CFTOKEN=30012962>.*

(Continued)

*Primary Examiner* — Thuy Dao
*Assistant Examiner* — Ben C Wang
(74) *Attorney, Agent, or Firm* — Baker & Hostetler LLP

(57) ABSTRACT

Techniques for debugging of a collection of instructions executed by a computing system including a set of actors are described herein. A first sub-set of actors from the set of actors to be monitored for debugging and one or more error condition associated with the collection of instructions may be identified. A set of indications including indications of messages processed by the actors, indications of associated actor states prior to processing of the messages, and indications of associated actor states subsequent to processing of the messages may be received from the sub-set of actors. It may then be determined that a first actor of the sub-set of actors has satisfied the error condition. Based at least in part on the set of indications, one or more messages associated with satisfaction of the error condition may then be identified, for example for re-processing and debugging.

14 Claims, 8 Drawing Sheets

(56) References Cited

U.S. PATENT DOCUMENTS

| | | | |
|---|---|---|---|
| 2006/0129988 A1* | 6/2006 | Calsyn | G06F 9/4843 717/124 |
| 2012/0254900 A1* | 10/2012 | Kumar | G06F 11/3476 719/328 |
| 2013/0283241 A1* | 10/2013 | Krajec | G06F 11/3636 717/128 |
| 2013/0318500 A1* | 11/2013 | Eker | G06F 11/3664 717/125 |
| 2013/0318504 A1* | 11/2013 | Eker | G06F 11/3636 717/128 |
| 2014/0053129 A1* | 2/2014 | Von Platen | G06F 9/4436 717/110 |
| 2014/0215443 A1* | 7/2014 | Voccio | G06F 11/3612 717/128 |
| 2016/0011951 A1* | 1/2016 | Beskrovny | G06F 11/3684 714/37 |
| 2016/0011959 A1* | 1/2016 | Li | G06F 11/3684 714/38.1 |
| 2016/0041894 A1* | 2/2016 | Reid, III | G06F 11/3636 714/45 |
| 2016/0085666 A1* | 3/2016 | Jordan | H04L 41/0266 714/38.1 |
| 2016/0092870 A1* | 3/2016 | Salama | G06Q 20/367 705/71 |
| 2016/0098325 A1* | 4/2016 | Madou | G06F 11/3476 714/49 |

OTHER PUBLICATIONS

Araujo et al., "An introspection mechanism to debug distributed systems", IEEE, Sep. 2012, pp. 21-30; <http://ieeexplore.ieee.org/stamp/stamp.jsp?tp=&arnumber=6337890>.*

Stanley et al., "Causeway: A message-oriented distributed debugger", HP Laboratories, Apr. 2009, pp. 1-15; <http://www.hpl.hp.com/techreports/2009/HPL-2009-78.pdf>.*

* cited by examiner

DEBUGGING IN AN ACTOR-BASED SYSTEM

BACKGROUND

In some examples, it may be advantageous to execute a program and/or program instructions using an actor-based model, in which multiple different actors may collectively execute program instructions. The actor-based model may offer a number of benefits, such as the ability of multiple actors to receive and respond to various messages concurrently or partially concurrently with one another. An executing program may have multiple associated actors that may be distributed across any number of physical devices at any number of different locations that may be remote and/or local with respect to one another. While the actor-based model may provide a number of advantages, the actor-based model may also present a number of challenges. For example, in some cases, debugging of a program that is executed using multiple different actors may be a complicated process that involves a number of difficulties. For example, traditional debugging techniques may involve the frequent use of break points and other stoppages of an executing program. However, in an actor-based system, large numbers of devices may sometimes be employed to execute a program, and coordinating a program stoppage across large numbers of devices may be a difficult and complicated process. Additionally, attempting to stop execution of multiple different actors, potentially on different physical devices, may cause various problems associated with implementation of program logic.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
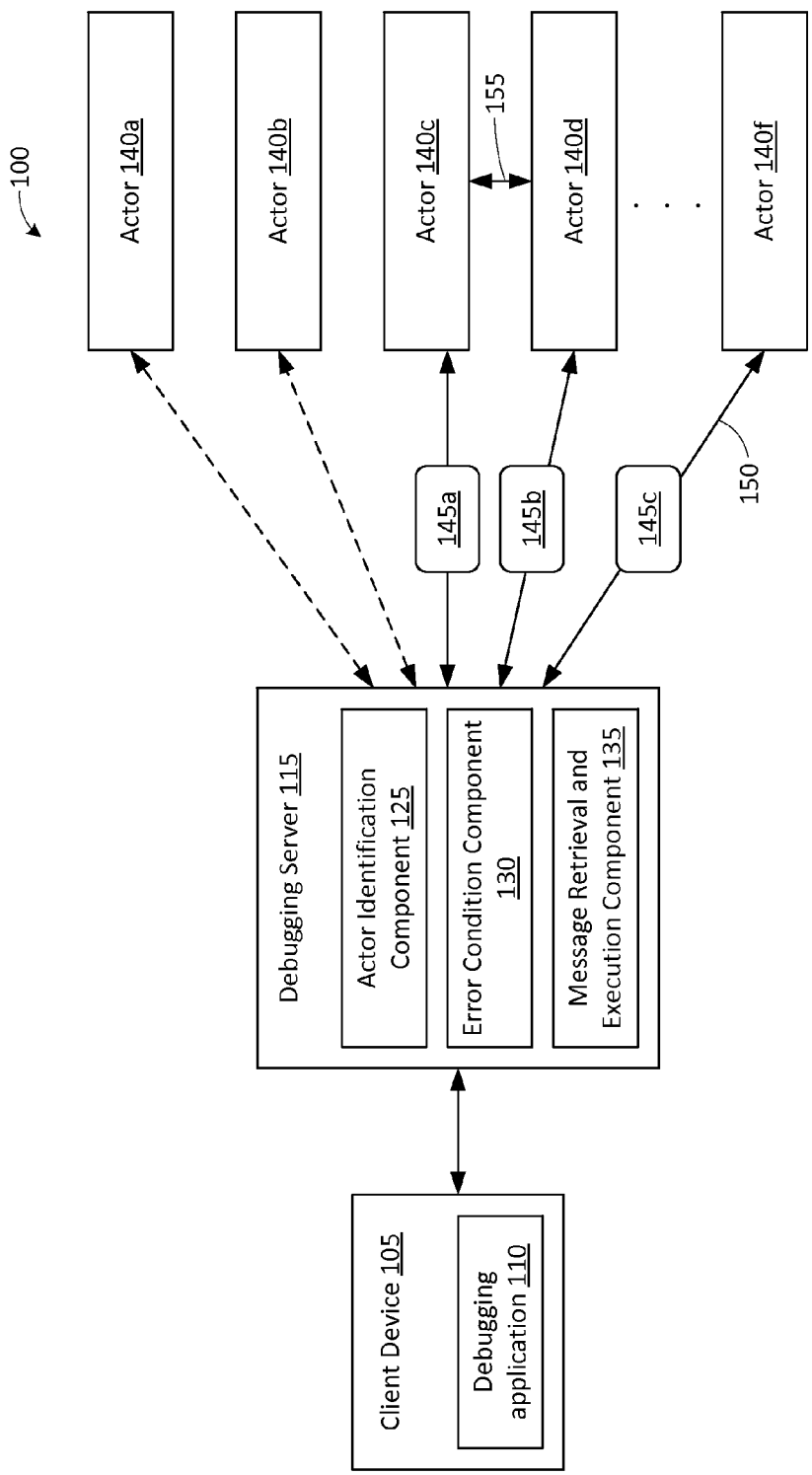
FIG. 1 is a diagram illustrating an example system for debugging instructions executed by multiple actors that may be used in accordance with the present disclosure.

Techniques for debugging in an actor-based system are described herein. In some examples, a computing system may perform various operations using a set of multiple actors. The actors may be modules, components, or other entities that may be capable of performing various computational tasks. For example, actors may receive and respond to various messages and may also send messages to other actors. In some examples, actors may be capable of performing various operations concurrently or partially concurrently with other actors. Thus, in some examples, the use of multiple actors may allow efficient utilization of the multi-core processing power of modern hardware. In some examples, actors may sometimes be employed to perform operations associated with graphical objects in video games and other electronic media, operations associated with electronic mail, web services, and other operations.

In some examples, a collection of instructions executed by a computing system including a set of actors may be debugged. Additionally, in some examples, a first sub-set of actors from the set of actors may be identified to be monitored for debugging. An error condition associated with the collection of instructions may also be identified. In some cases, the identification of the first sub-set of actors and/or the error condition may include receiving one or more selections or inputs via a user interface. During execution or runtime of the collection of instructions, a set of indications may be received from one or more actors in the selected sub-set of actors, for example, at various time intervals, upon satisfaction of an error condition (e.g., indicating an occurrence of an error), etc. The set of indications may include indications of messages processed by one or more of the actors, indications of associated actor states prior to and subsequent to processing of the messages, and other indications concerning the execution of the collection of instructions. It may next be determined that a first actor of the sub-set of actors has satisfied the error condition. Then, based at least in part on the received set of indications, one or more messages associated with the satisfaction of the error condition may be identified.

In some examples, upon identifying the one or more messages, instructions may be sent to the first actor to repeat execution of the one or more messages, such that at least one, and possibly all of the rest of the actors continue to process messages during repetition of the one or more messages by the first actor. In this way, error conditions may be evaluated on a per-actor basis, such that execution of relevant messages or portions of the collection of instructions may sometimes be repeated by an actor while another or other actors continue to execute the collection of instructions. This may enable a developer to focus on individual actors to more efficiently identify the cause or source of an error and to more readily fix or correct the condition that caused the error, without interrupting execution of other actors or portions of the collection of instructions.

In some examples, the retrieved messages may be sent to an isolated component separate from the first actor to repeat execution of the one or more messages. This may enable multiple repeat executions of the portion of collection of instructions independent from the rest of the system, without interrupting the first actor and other actors executing other portions of the collection of instructions. In some cases, the separate component may repeatedly execute the messages associated with the error condition while another or other actors in the sub-set continue to execute the collection of instructions.

In some examples, upon receiving configuration information associated with at least one error condition, instructions may be sent to one or more actors of the first sub-set of actors to report the satisfaction of at least one error condition. The instructions may include instructions to be placed or inserted into the portion of the collection of instructions that are executed by one or more identified actors that cause the actor to send the set of indications. In some examples, each error condition may be associated with one or multiple actors, for example, via a user interface. In some examples, the error condition configuration information may include one or more of an expected state value, a defective state value, and/or identification information of at least one actor of the first sub-set of actors.

In some examples, a user interface may provide selections for receiving one or more inputs, such as a sub-set of actors and/or one or more error conditions and the configuration information associated therewith. The user interface may be configured to display at least a portion of the received set of indications for each actor of the first sub-set of actors that has satisfied the error condition. In some cases, the user interface may provide selectable items corresponding to each of the actors of the set of actors. In response to receiving a selection event corresponding to one of the selectable actors, the messages from the selected actor may be retrieved, for example, to further enhance the user experience in debugging a collection of instructions or program.

FIG. 1 is a diagram illustrating an example system 100 for debugging instructions executed by multiple actors that may be used in accordance with the present disclosure. As shown, system 100 includes a debugging server 115 in communication with multiple actors 140, for example, over a communications network, via communication links 150. The debugging server 115 may also be in communication with a client device 105, for example, that may provide an application 110 for debugging a collection of computer-executable instructions or program. As will be described in detail below, the debugging server 115 may coordinate execution and debugging of a set of instructions by actors 140, for example, by engaging in one or more communications 145a, 145b, 145c, with individual actors 140c, 140d, 140f, such as communications regarding message processing and state indications, error conditions, and other communications. The debugging server 115 may receive indications from actors 140 and coordinate repeat independent execution of instructions of relevant portions of the set of instructions by individual actors 140 to further enhance the debugging or error checking and identification process. In some examples, one or more actors 140, such as actors 140c and 140d, may communicate information, such as one or more messages, state values, or other values, with each other over link 155, for example, during execution of the collection of instructions. In some examples, the debugging server 115 may instruct one or more actors 140 and/or other components to begin execution of a collection of instructions for debugging. The collection of instructions may, for example, be stored in one or more memories for execution. In some examples, the actors 140 may, at least in part, execute a collection of instructions by receiving and responding to various messages associated with the collection of instructions. For example, a message may be addressed to an individual actor 140 using, for example, an identifier associated with the actor 140, and, upon receiving the message, the actor 140 may process and respond to the message. Messages may be sent from actors 140 to other actors 140 and/or to or from other components or devices.

As illustrated, the debugging server 115 may include an actor identification component 125, an error condition component 130, and a message retrieval and execution component 135. The actor identification component 125 may receive identification information of or associated with one or more actors 140 for execution of a set of instructions or program, such as a sub-set of all available actors 140. In one example, a first sub-set of actors may include actors 140c, 140d, and 140f, and may exclude actors 140a and 140b. It should be appreciated that other numbers of actors and other, multiple groupings of actors into sub-sets, is contemplated herein. In some examples, the identification information may be received from client device 105 via debug application 110. The debugging server 115 may then proceed, via communications 145a, 145b, 145c, to request various information from each actor 140c, 140d, 140f, such as indications of processed messages and associated actor states.

The error condition component 130 may receive error condition information for configuring one or more error conditions, for example, from the client device 105. In some examples, the error condition may be indicated by specifying an expected actor state, such as in response to various inputs, events, and/or conditions. If, in response to the various inputs, events, and/or conditions, the resulting actor state differs from the expected state, then the error condition may be satisfied. Also, in some examples, the error condition may be indicated by specifying one or more known defective states. In such cases, the error condition may be satisfied, for example, when an actor state becomes equivalent to or otherwise associated with a defective state. In some examples, defective states may also be linked to, or associated with, various inputs, events, and/or conditions.

In some examples, an error condition may be indicated by specifying a defective value or range of values for a given state or variable. By contrast, in some examples, an error condition may be indicated by specifying an expected value or range of values and then setting the error condition to include values outside of the specified expected value or range of values. In addition to values, the error condition may alternatively or additionally be based on other data attributes, such as formats, times, positions, or of other aspects of the collection of instructions. In one specific example, an error condition may be configured by having a developer specify an acceptable data format and then setting the error condition to include formats other than the specified acceptable data format.

In some examples, a specified error condition may be indicated as a global error condition, which may, for example, be applicable to any of the actors that are being monitored for debugging. In other examples, a specified error condition may be indicated as a local error condition, which may, for example, be applicable only to one or more actors that are specifically linked to or otherwise associated with the error condition, such as by providing an identifier of those actors in combination with the indication of the error condition. In addition to the examples described above, many other types and/or customizations of error conditions are also contemplated herein.

Upon configuration of one or more error conditions, the error condition component 130 may communicate a trigger or instructions associated with the error condition to pertinent actors 140. As described herein, the effect of satisfaction of an error condition, e.g., a trigger, is configurable, such as to include pausing or stopping execution of instructions by a single actor 140 while other actors 140 continue to execute the instructions. Also, in response to satisfaction of an error condition, multiple actors 140 may sometimes be paused, or a relevant instruction set may be extracted and packaged into an isolated container, executable by another device or component separate from the set of actors 140.

The debugging server 115 may begin the execution of the collection of instructions, for example, via communications with the actors 140. Each actor 140 may be configured, for example via instructions received from the debugging server 115, to report certain information, such as a set of indications, to the debugging server 115 during execution of the collection of instructions. The set of indications may include indications of messages processed by the actors, indications of associated actor states prior to processing of the messages, and indications of associated actor states subsequent to processing of the messages. An example set of message processing indications will be described in greater detail below in reference to FIG. 3. The reporting may be configured to occur periodically, such as at regular and/or irregular time intervals based on any of a number of factors, such as available bandwidth over communication links 150, processing capabilities of the actor 140, or other conditions that may potentially limit or detract from the performance and/or execution of the collection of instructions. In some examples, the reporting may be configured to occur upon the occurrence of sending or receiving messages by each actor 140 or from a specific actor 140. In other examples, the reporting may be configured to occur based on a change in one or more variables or states of one or more actors 140. In yet other examples, the reporting may be configured to occur in response to the satisfaction of one or more error conditions.

The debugging server 115, for example via the error condition component 130, and/or one or more actors 140 may determine that satisfaction of one or more error conditions has occurred. Once this determination is made, the message retrieval and execution component 135 may request messages relating to the satisfaction of the error condition from the relevant actors 140. In some examples, the messages may include state or variable information, such as one or more inputs received by a certain actor 140 for processing or manipulation by the actor 140. In some examples, the messages retrieved that are associated with the satisfaction of an error condition may be configured in a number of ways, for example, based on the type of application or program being debugged, previously identified problems in the application, and others. In one example, the messages retrieved may include a certain number of messages received and/or transmitted before and/or after the occurrence of an error condition, messages failing with a configurable time frame of the occurrence of the error condition, and others. Upon receiving the requested messages, the message retrieval and execution component 135 may then coordinate repeat execution of the relevant portion of the collection of instructions using the received messages. In some examples, this may include instructing the actor 140 with which the satisfaction of the error condition is associated with to repeat execution of the instructions using the retrieved messages, while one or more other actors 140 continue to execute the collection of instructions.

In this way, isolation of one or more actors 140 during execution of a collection of instructions for debugging may enable more efficient identification of errors associated with a program or application. In some cases, for example, when multiple actors 140 are concurrently executing portions of a program for debugging, it may be difficult and time consuming to instruct each actor to stop executing the program. This delay may complicate the debugging process and introduce inefficiencies into the identification and resolution of error-causing instructions or code. By only stopping the execution of one or more actors 140 associated with an error condition during debug execution of the program, the above described delays and inefficiencies may be significantly reduced. Further, by enabling the repeat execution of messages by the actor 140 associated with the satisfaction of the error condition, while other actors 140 are continuing to execute the program, the cause or causes of the error condition may be more readily ascertained, to reduce the overall time that is required to debug a program, application, or other set of computer executable instructions.

Figure 2:
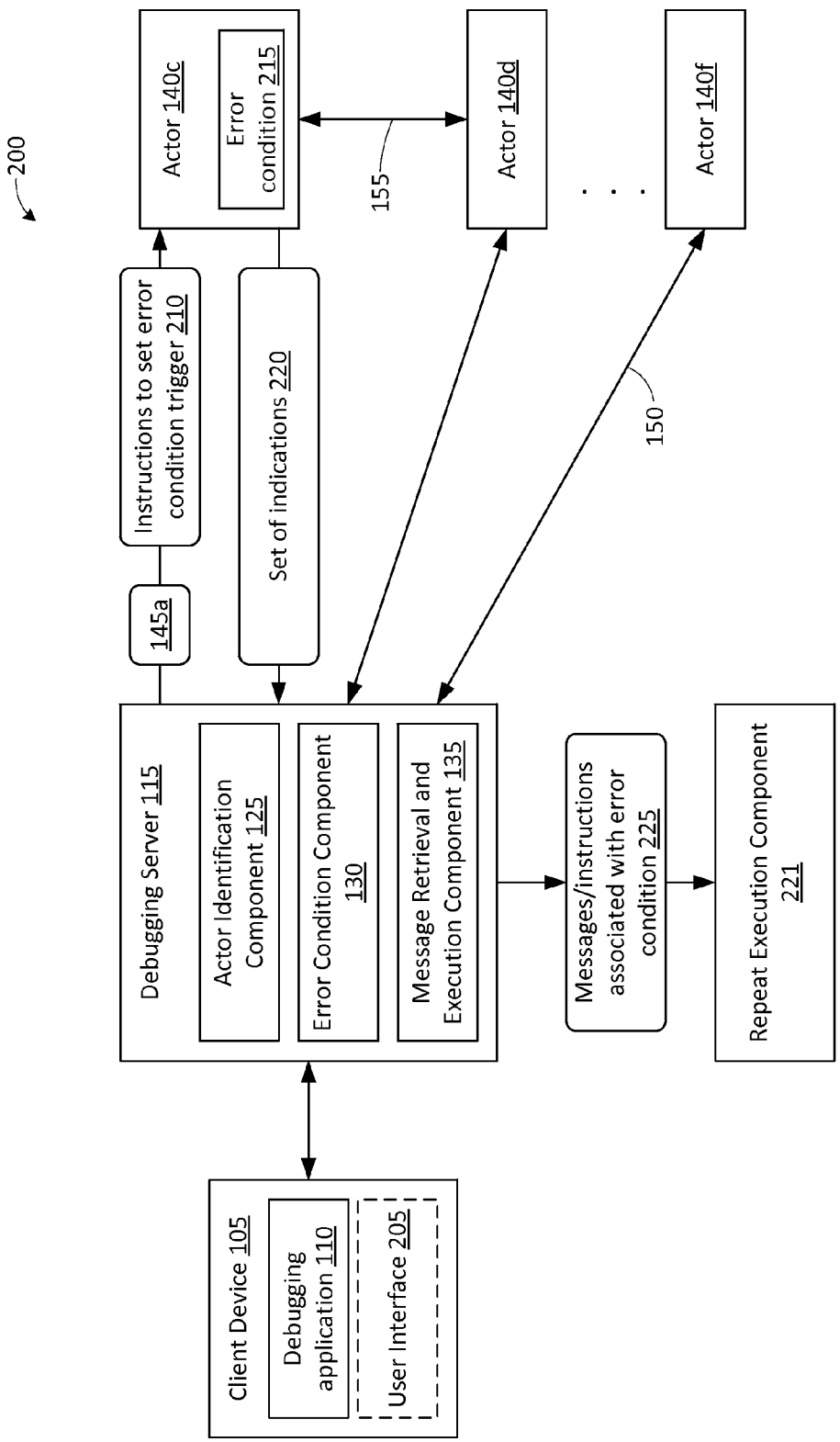
FIG. 2 is a diagram illustrating another example system for debugging instructions executed by multiple actors that may be used in accordance with the present disclosure.

FIG. 2 illustrates another example system 200 for debugging instructions executed by multiple actors that may be used in accordance with the present disclosure. As shown, system 200 includes a debugging server 115 in communication with multiple actors 140 via communication links 150 and client device 105, as described above in reference to system 100 of FIG. 1. System 200 may incorporate features and aspects of system 100, and these common features will not be described again here. In addition, debugging server 115 may also be in communication with a repeat execution component 221, which may be separate from one or more actors 140. In some examples, the client device 105 may include a user interface 205, which may, in coordination with the debugging application 110 also on the client device 105, provide a user interface configured to display selectable configuration options and outputs for performance of the execution of a collection of instructions for debugging. In some examples, the user interface 205 may be a web-based application, such that the client device 105 may access the interface 205 over the web. An example user interface will be described in greater detail below in reference to FIG. 7.

As described above, the debugging server 115 may engage in various communications with one or more actors, such as communications 145a with actor 140c, including communications regarding message processing and state indications, error conditions, and other communications. For example, the error condition component 130 of debugging server 115 may, upon receiving configuration or trigger information associated with one or more error conditions, transmit instructions to set an error condition trigger 210 to actor 140c. In some examples, an error condition trigger 210 may be configured for a specific actor 140c, or a group of actors 140, and may include state or variable error conditions, format error conditions, etc., as described above. The instructions to set an error condition trigger 210 may include instructions to embed specific error condition detection and reporting instructions (e.g., set a fake or modified break point) 215 into the collection of instructions being debugged, by way of a separate routine or program, a set of instructions to be embedded in the collection of instructions being debugged, or by modifying the functionality of a messaging component or handler of the actor 140c. In some cases, the instructions 210 may direct a messaging component or handler of the actor 140c to monitor received and/or sent messages between actor 140c and other actors 140 containing one or more specified state values or meeting other criteria. Periodically and/or upon occurrence of the error condition trigger 210, the actor 140c may send a set of indications 220 to the debugging server 115.

Figure 3:
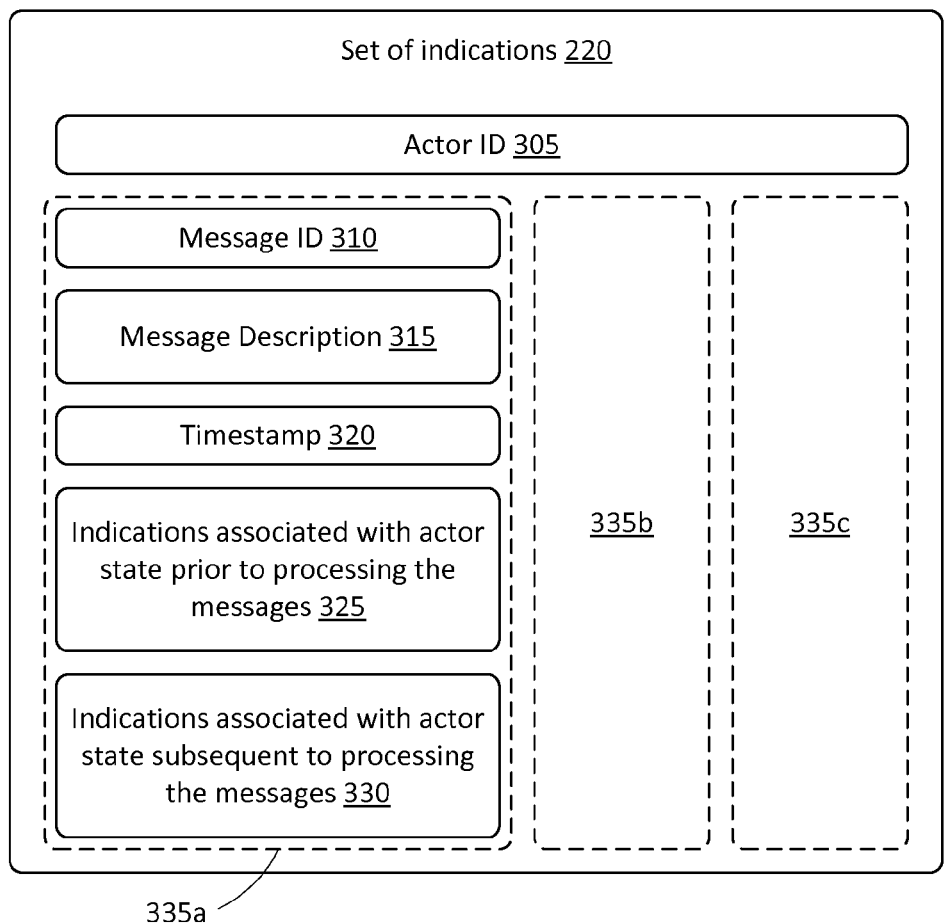
FIG. 3 is a diagram illustrating an example set of indications associated with actor message processing that may be used in accordance with the present disclosure.

An example set of indications 220 associated with actor message processing is illustrated in FIG. 3. The set of indications 220 may include an actor ID 305 that identifies actor 140c. The set of indications 220 may also include, for each relevant message 335a, 335b, 335c, a message ID 310, a message description 315, a timestamp 320, indications 325 associated with one or more actor states prior to processing the message by actor 140*c*, and indications 330 associated with one or more actor states subsequent to processing the message by actor 140*c*. In some examples, the set of indications may be divided into relevant information associated with each message, such as 335*a*, 335*b*, and 335*c*, or may be grouped together including information of one or more messages relevant to a trigger event, over a certain time period, etc. In some examples, when information concerning multiple messages is included in the set of indications 220, the information may be organized in a hierarchical and/or chronological order. It should be appreciated that other organization schemes, other formats, and/or other information may be included in or excluded from the set of indications 220. In some examples, the state information included in the set of indications 220 may include various forms of values, such as key value pairs, binary values, multiple components of values, etc., and may be written in a variety of languages, such as JavaScript Object Notation (JSON).

Referencing back to FIG. 2, the debugging server 115 may determine that an actor 140*c* of a subset of actors including actors 140*c*, 140*d*, and 140*f*, has satisfied an error condition. The determination, in some cases, may be made by the debugging server 115. In this example, each actor 140 may send a set of indications 220 periodically and/or upon occurrence of a trigger event, such as sending and/or receiving one or more messages, a state value or other variable value changing, etc. The debugging server 115 and/or error condition component 130 may compare information received in the set of indications 220 to one or more reference values, states, etc., to determine if a particular error condition has been satisfied. In some cases, especially when a larger set of instructions or program is being debugged, a large amount of information may be generated and reported by each actor 140. In this scenario, the debugging server 115 may filter which sets of indications 220 are retained and stored, for example, based on relevant states, limited by actors 140, and so forth. In this way, storage requirements for the debugging system 200 may be reduced. In some cases, each actor may implement a similar filtering function, by only reporting sets of indications 220 that are relevant to certain states or errors, for example, indicated by a user of system 200.

In one example, the collection of instructions for debugging may relate to a program that tracks or displays positions of an object, entity, character, etc. (e.g., a character in a video game, a car on a map, etc.). An error condition in this scenario may relate to one or more locations (e.g., two or three values representing x, y, and/or z coordinates) or location ranges. In the process of configuring one or more error conditions, a specific location of a certain object or character, which may be configured, may correspond to a subsequent action to be performed (e.g., the coordinate location of a character triggering a scene change or a collision). This value or values, which may be referred to as state values, may be set as the correct or expected values that should occur upon occurrence of one or more other conditions (e.g., a character moving to the specified location), that then trigger the subsequent action (e.g., the scene change). Any values that are incorrect or unexpected (e.g., not equal to or not within a range of error of expected values) may be set to trigger the error condition. In this case, the error condition component 130 may compare the expected values with the indicated values sent in the set of indications 220. If the values do not match, the error condition may be determined to be satisfied.

In some examples, the actor 140*c* itself may be configured, via instructions 210, to determine when an error condition has been satisfied. In this case, the debugging server 115 may determine that the error condition has been satisfied based on receiving an indication of a satisfaction of the error condition from the actor 140*c*.

Once the satisfaction of an error condition has been determined, the message retrieval and execution component 135 may request, from the actor 140*c* associated with the error condition, and other actors 140 from which inputs associated with satisfaction of the error condition originate, messages associated with satisfaction of the error condition and/or the instruction set executed by the actor 140*c* resulting in the error. The message retrieval and execution component 135, as described above, may configure which messages it requests and from which actors 140 based on a number of parameters, which may be user configurable. These parameters may include a number of messages, for example, form one or all of the associated actors 140, a timeframe limit on what messages are transmitted and received by the actor 140*c* associated with the satisfaction of the error condition, messages containing state or other variable values within certain ranges or having specific values, and so on. In some cases, the message retrieval and execution component 135 may be granted access to examine a message queue of a particular actor 140, for example, to enable more precise identification of messages relevant to the satisfaction of an error condition.

As depicted in FIG. 2, the message retrieval and execution component 135 may package the instruction set and retrieved messages associated with the error condition into an isolated container 225, and send the isolated container 225 to a repeat execution component 221. In some cases, the debugging server 115 may instruct the actor 140*c*, upon satisfaction of an error condition, to generate an executable/source file or script containing the computer executable instructions relevant to the error condition to enable packaging of the isolated container 225 for execution by another independent component, such as component 220. The repeat execution component 221 may, according to instructions from the client device 105, execute the collection of instructions and/or messages any number of times to aid in the identification of the cause of the error condition. In some examples, by sending the relevant messages to the repeat execution component 221, errors relating to both other actors 140 and instructions executed by actor 140*c* (e.g., formulas, etc.) may potentially be more easily identified by looking at inputs, outputs and other values.

In some examples, one or more actors 140, including actor 140*c* associated with the satisfaction of the error condition, may continue to execute the collection of instructions while the repeat execution component 221 operates. This may enable isolation between debugging certain portions of a set of instructions from execution of the entire collection of instructions, thus enabling more efficiency and flexibility in the debugging process. This may further enable uninhibited execution of the collection of instructions for debugging, for example, when other actors 140 require additional inputs from actor 140*c* to continue execution of the collection of instructions.

It should be appreciated that, although FIG. 2 includes a repeat execution component 221, there is no requirement that the repeat execution component must be used in all cases. For example, as set forth above, in some cases, messages associated with satisfaction of an error condition may be repeatedly executed directly on the actor 140*c* associated with satisfaction of the error condition. It is noted, however, that even when messages are executed repeatedly on a particular actor 140c, other actors 140 may continue to execute the collection of instructions without repetition, thereby increasing the efficiency of the debugging process.

Figure 4:
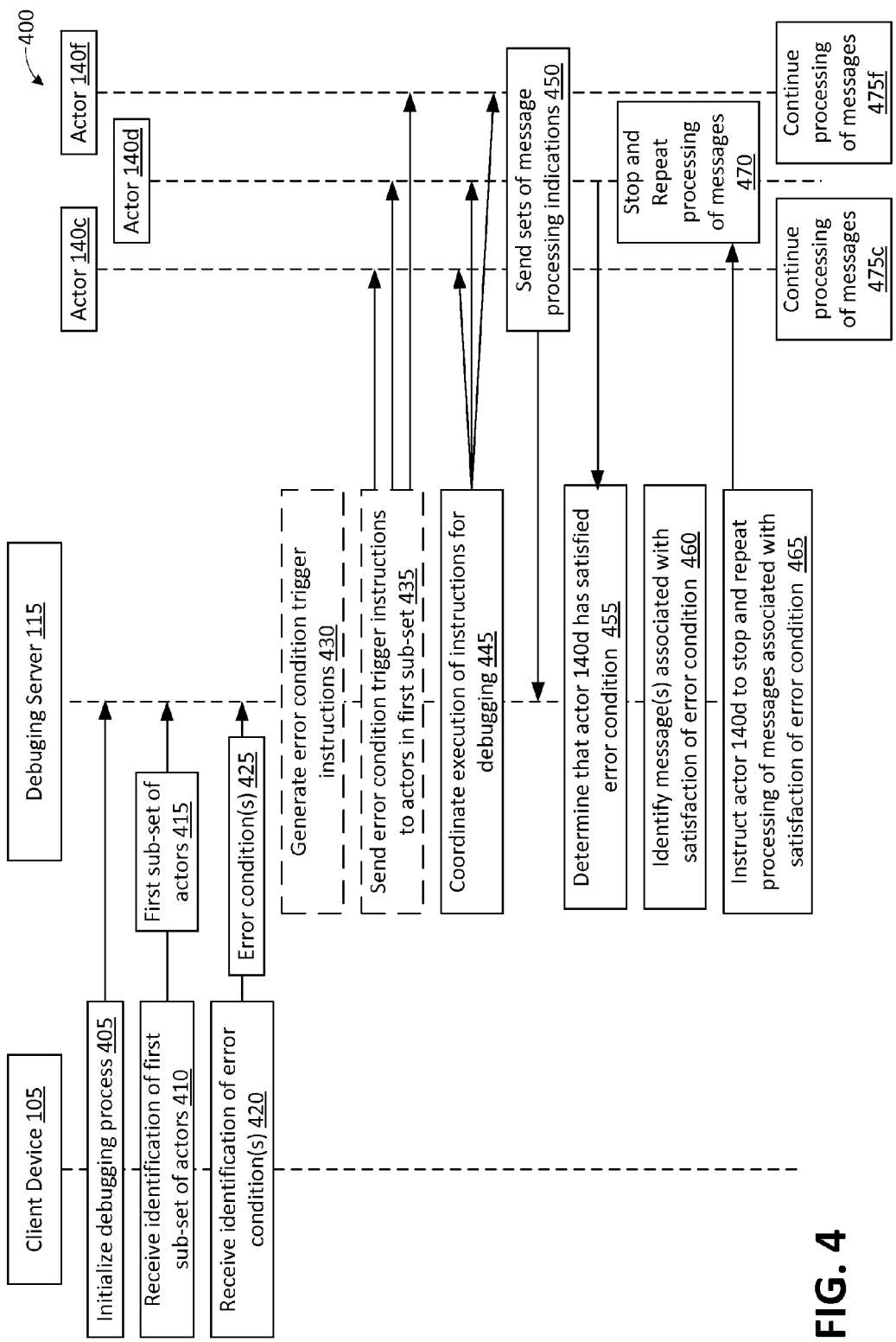
FIG. 4 is a diagram illustrating example communications between a client device, a debugging server, and multiple actors within an example debugging process that may be used in accordance with the present disclosure.

FIG. 4 illustrates example communications between client device 105, debugging server 115, and actors 140, within an example debugging process 400 that may be used in accordance with the present disclosure. In some examples, debugging process 400 may be implemented by system 100 and/or 200 as described above.

Client device 105 may initialize debugging process 400 at operation 405, for example, via receiving one or more inputs and a collection of computer executable instructions or code for debugging. At operation 410, the client device 105 may also receive identification information of a first sub-set of actors, such as actors 140c, 140d, and 140f described above. The client device 105 may additionally receive identification information relating to one or more error conditions at operation 420. Operations 405, 410, and 420 may be implemented in conjunction with a user interface, such as user interface 205 or 700, which will be described in greater detail below in reference to FIG. 7. The client device 105 may communicate the first sub-set of actors (operation 415) and the error condition(s) (operation 425) to the debugging server 115. In some examples, based on the sub-set of actors and the error condition(s), the debugging server may generate and send error condition trigger instructions to actors 140c, 140d, 140f, in the first sub-set at operations 430 and 435. The instructions may direct each actor 140c, 140d, 140f to monitor for the satisfaction of an error condition in a number of ways, such as by monitoring messages via a message handler of each actor 140. The debugging server 115 may then coordinate execution of the instructions for debugging via communications with the actors 140 at operation 445.

The actors 140 may send sets of message processing indications, such as shown in FIG. 3, back to the debugging server 115 at operation 450. In some examples, the actors 140 may continually send sets of message processing indications upon completion of processing of one or more messages. In other examples, actors 140 may send sets of message processing indications upon satisfaction of an error condition. In yet other examples, actors 140 may send sets of message processing indications at other times, such as at specified time intervals, in response to various events, data values, program progress, or other times or conditions.

At operation 455, the debugging server determines that an actor 140d has satisfied an error condition. In some examples, the actor 140d may itself detect that it has satisfied an error condition and may send an explicit indication of satisfaction of the error condition to the debugging server. Thus, operation 455 may sometimes include determining that an actor has satisfied the error condition based on receiving an explicit indication from an actor that the error condition has been satisfied. In other examples, the debugging server may determine that an error condition has been satisfied without receiving an explicit indication from an actor that the error condition has been satisfied. For example, in some cases, the debugging server may analyze actor state information, such as may be included in the sets of message processing indications, to determine that an error condition has been satisfied. In some examples, the debugging server may analyze actor state information based on a comparison of expected state values with received state values.

The debugging server 115 may identify message(s) associated with the satisfaction of the error condition at operation 460. The identification of messages associated with the satisfaction of the error condition may be based on, for example, the received sets of message processing indications and possibly other parameters as described above.

In the example of FIG. 4, upon identifying the messages associated with the satisfaction of the error condition at operation 460, the debugging server 115 may, at operation 465, instruct actor 140d to stop its current processing of messages and to repeat processing of the messages associated with the satisfaction of the error condition. In response, at operation 470, actor 140d may stop its current processing of messages and repeat processing of the messages associated with the satisfaction of the error condition. It is noted, however, that the instructions to stop and repeat processing of messages at operation 465 may be only directed to actor 140d. Thus, at operations 475c and 475f, that actors 140c and 140f may continue their current processing of the messages. This may enable the execution of the program by other actors (e.g., actors 140c and 140f) to continue without interruption, while also enabling more directed control and testing of a part of the program associated with the error condition at actor 140d.

Figure 5:
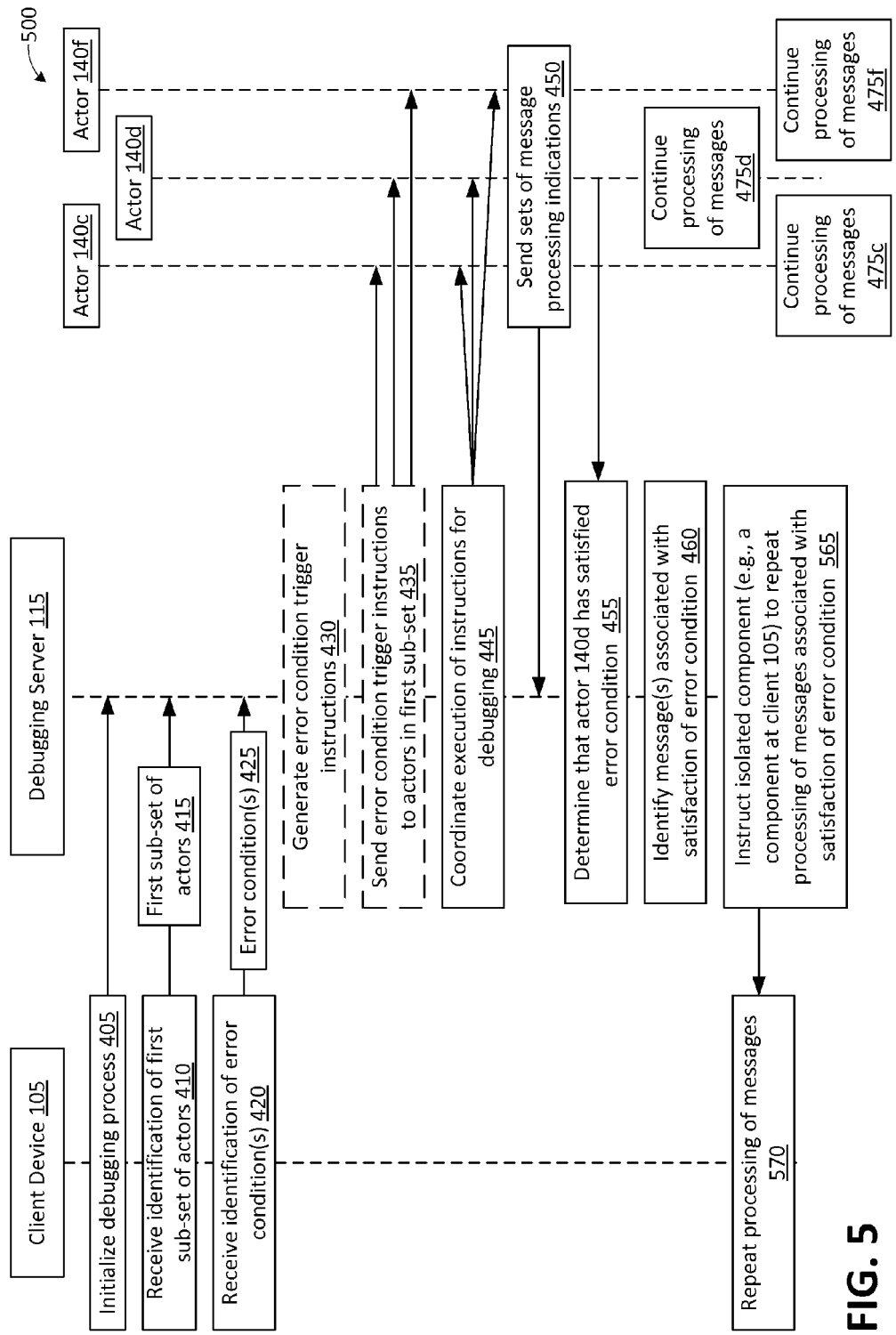
FIG. 5 is a diagram illustrating other example communications between a client device, a debugging server, and multiple actors within another example debugging process that may be used in accordance with the present disclosure.

FIG. 5 illustrates other example communications between client device 105, debugging server 115, and actors 140 within another example debugging process 500 that may be used in accordance with the present disclosure. In some examples, process 500 may be implemented by system 100 and/or 200 as described above.

Descriptions of common aspects shared by the process 400 and 500 of FIGS. 4 and 5 will not be repeated. In particular, operations 405-460 are identical in FIGS. 4 and 5, and, accordingly, those operations are not described again here. The description of FIG. 5 begins at operation 565, at which, upon identifying the messages associated with the satisfaction of the error condition by actor 140d, the debugging server 115 may instruct an isolated component to repeat processing of the messages associated with the satisfaction of the error condition. At operation 570, the isolated component repeats processing of the messages. The isolated component is separate from actors 140 and, therefore, does not require stoppage of any of actors 140 in order to repeat processing of the messages associated with the satisfaction of the error condition. In the example of FIG. 5, the isolated component is executed at client device 105. However, the isolated component may execute on any device that does not require the stoppage of actors 140 in order to repeat processing of the messages associated with the satisfaction of the error condition. By using the isolated component, uninterrupted or substantially uninterrupted execution of the entire set of instructions by each actor 140c, 140d, and 140f may be enabled. In particular, as shown in FIG. 5, actors 140c, 140d, and 140f continue execution of messages at operations 475c, 475d and 475f.

Figure 6:
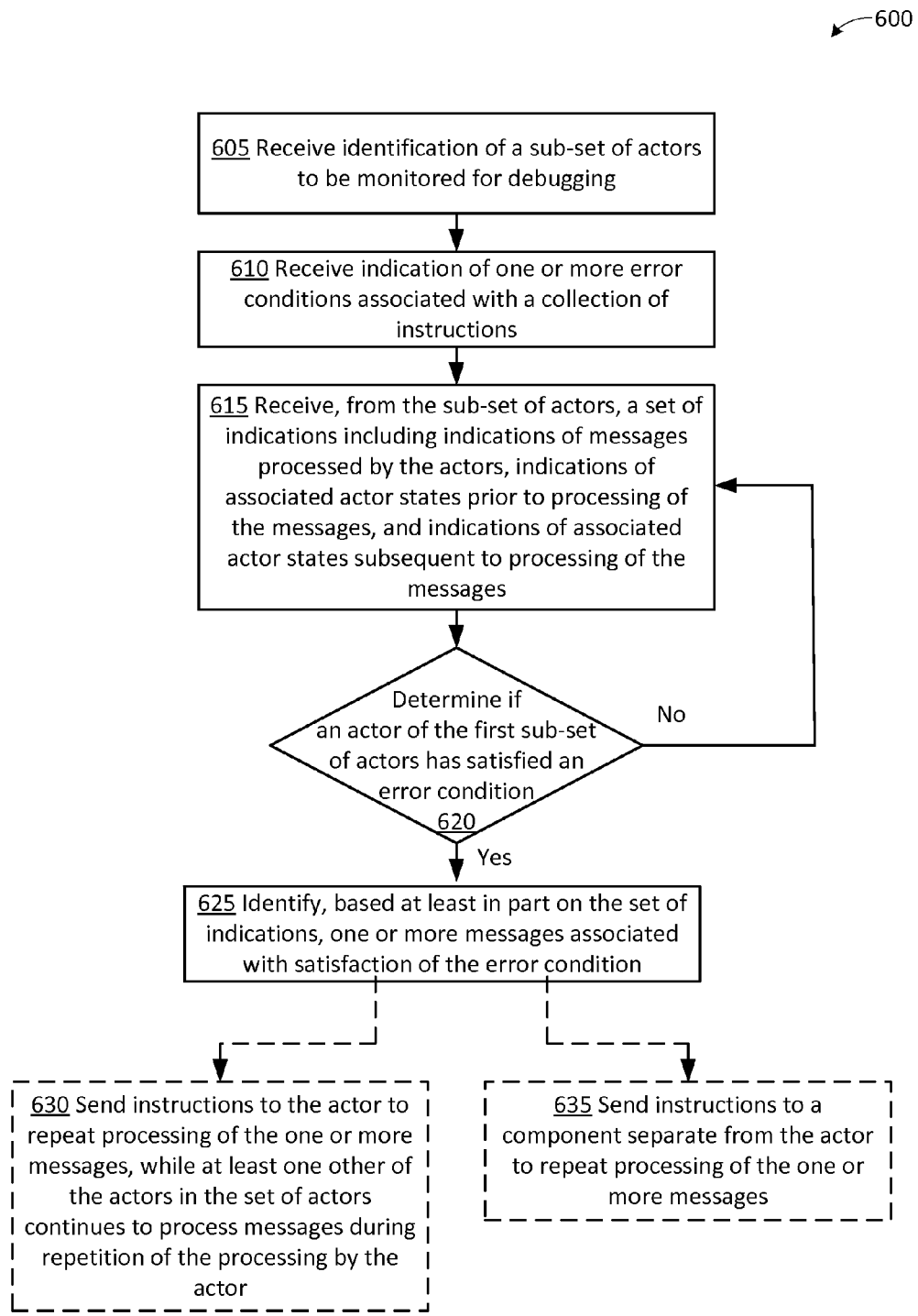
FIG. 6 is a flowchart illustrating an example process for debugging a set of instructions executed by multiple actors that may be used in accordance with the present disclosure.

FIG. 6 is a flowchart illustrating an example process 600 for debugging a set of instructions executed by multiple actors that may be used in accordance with the present disclosure. In some examples, process 600 may be implemented by system 100 and/or 200, and/or may include one or more aspects of processes 400 and/or 500 described above.

Process 600 may begin with receiving an identification of a sub-set of actors to be monitored for debugging, at operation 605. As set forth above, in some examples, a program or a set of instructions that is being debugged may be executed, at least in part, by a set of actors. However, in some examples, the entire set of actors on which the program is executed may include a large number of actors, and it may be difficult and inefficient to monitor the entire set of actors for debugging purposes. For these and other reasons, in some examples, a developer or other party or software component may identify a sub-set of actors that is to be monitored for debugging. The identification of the actors within the sub-set may, in some examples, be received by the debugging server. In some examples, message processing indications, such as described above with reference to FIG. 3, may be received only from the identified sub-set of actors and not from other actors that aren't included within the identified sub-set. This may reduce the total amount of messages that are received and processed by the debugging server and/or other components, thereby potentially reducing unnecessary communications and reducing the amount of data that is examined and processed by the debugging server and/or other components. In some examples, after receiving an identification of the sub-set of actors, the debugging server may subscribe to or otherwise request to receive message processing indications from the sub-set of actors. In some other examples, the debugging server may receive message processing indications from all actors but may ignore message processing indications that are not received from an actor in the identified sub-set of actors.

At operation 610, an indication may be received of one or more error conditions associated with the collection of instructions that is being debugged. In some examples, the indication of an error condition may be received by the debugging server. In some examples, an error condition may be satisfied based, at least in part, on a state of an actor in response to processing of a message. Also, in some examples, an error condition may be satisfied based, at least in part, on an actor state differing from an expected state. As set forth above, in some cases, an error condition may be indicated by specifying an expected actor state, such as in response to various inputs, events, and/or conditions. If, in response to the various inputs, events, and/or conditions, the resulting actor state differs from the expected state, then the error condition may be satisfied. Also, in some examples, an error condition may be indicated by specifying one or more known defective states. In such cases, the error condition may be satisfied, for example, when an actor state becomes equivalent to or otherwise associated with a defective state. In some examples, defective states may also be linked to, or associated with, various inputs, events, and/or conditions.

In some examples, an error condition may be indicated by specifying a defective value or range of values for a given state or variable. By contrast, in some examples, an error condition may be indicated by specifying an expected value or range of values and then setting the error condition to include values outside of the specified expected value or range of values. In addition to values, the error condition may alternatively or additionally be based on other data attributes, such as formats, times, positions, or of other aspects of the collection of instructions.

As also set forth above, in some examples, a specified error condition may be indicated as a global error condition, which may, for example, be applicable to any actor that is being monitored for debugging. In other examples, a specified error condition may be indicated as a local error condition, which may, for example, be applicable only to one or more actors that are specifically linked to or otherwise associated with error condition, such as by providing an identifier of those actors in combination with the indication of the error condition.

In some examples, received indications of error conditions may be provided by the debugging server to each actor to which the error condition is applicable and also possibly to other actors. This may, for example, allow the actors themselves to determine when an error condition is satisfied.

Process 600 may continue with receiving, from the sub-set of actors, a set of indications, including indications of messages processed by the actors, indications of associated actor states prior to processing of the messages, and indications of associated actor states subsequent to processing of the messages, at operation 615. In some examples, the set of indications may be received by the debugging server. Some examples of the set of indications received at operation 615 are described in detail above, such as with respect to FIG. 3 and are not repeated here.

Process 600 may proceed by determining if an actor of the sub-set of actors has satisfied an error condition at operation 620. As set forth above, the determination that an actor has satisfied the error condition may be made, for example, by comparing an actor's state to one or more expected states and/or one or more defective states. In some examples, if an actor's state fails to match an expected state and/or matches a defective state, then the actor may be determined to satisfy the error condition. Also, in some example, the expected states and/or defective states to which the actor's state is compared may be based on various factors, such as various, inputs, events, conditions, or other factors.

In some examples, the debugging server may determine if an actor of the sub-set of actors has satisfied an error condition. In some cases, an actor may itself detect that the actor has satisfied the error condition. In these cases, the actor may sometimes send an indication to the debugging server to indicate that the actor has satisfied the error condition. Upon receiving such an indication, the debugging server may determine, based on the received indication, that the actor has satisfied the error condition. In some other cases, the debugging server may determine that an actor has satisfied an error condition without receiving an indication explicitly indicating that the error condition has been satisfied. Rather, the debugging server may itself compare actor states to expected and/or defective states to determine that the error condition has been satisfied. For example, the debugging server may retrieve actor states from the set of indications received at operation 615 and compare those actor states to expected and/or defective states.

If an error condition has not been satisfied, process 600 may loop back and receive another set of indications at operations 615. Once an error condition is determined to be satisfied at operation 620, process 600 may continue to operation 625, at which one or more messages associated with satisfaction of the error condition may be identified based at least in part on the received set of indications. In some examples, the one or more messages associated with satisfaction of the error condition may be identified by the debugging server. A set forth above, in some examples, the messages associated with satisfaction of the error condition may be identified based, at least in part, on one or more configurable parameters. One such configurable parameter may be a configurable number of processed messages prior to the satisfaction of the error condition. For example, the debugging server may sometimes be configured to identify the last ten messages processed by an actor prior to satisfaction of the error conditions. Another such configurable parameter may be a configurable time period prior to the satisfaction of the error condition. For example, the debugging server may sometimes be configured to identify the messages processed by an actor within a thirty second time period prior to satisfaction of the error conditions. Other configurable parameters may include messages associated with particular values, formats, areas, locations, characters, weapons, and many others. Also, in some examples, a developer or other user may select particular messages from the set of indications that are associated with satisfaction of the error condition, and such a user selection may cause the selected messages to be identified by the debugging server.

In some examples, process 600 may continue to operation 630, where instructions may be sent to the actor (i.e., the actor that satisfied the error condition) to repeat processing of the one or more messages identified at operation 625. Also, at operation 630, at least one other of the actors in the set of actors continues to process messages during the repetition of the processing of the one or more messages by the first actor. This may allow debugging of the error condition without causing other actors to stop processing, thereby avoiding inefficiencies such as those described above associated with stopping potentially large groups of actors on different devices.

In other examples, process 600 may continue to operation 635, where instructions may be sent to a component separate from the actor to repeat processing of the one or more messages identified at operation 625. This may offer the further of advantages of not requiring any actors, including the actor on which the error condition was satisfied, to stop processing and executing the collection of instructions.

Figure 7:
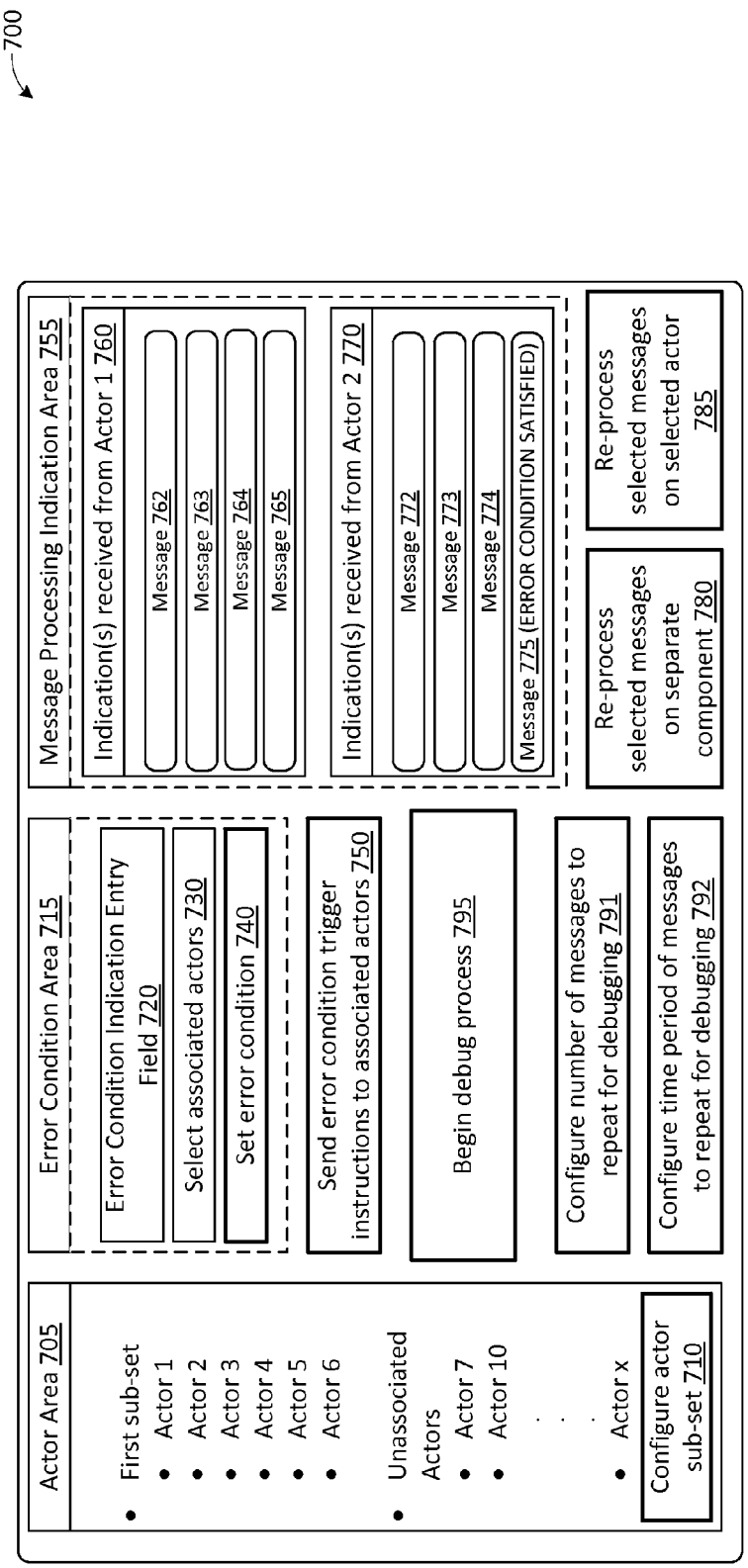
FIG. 7 is a diagram illustrating an example user interface for debugging instructions executed by multiple actors that may be used in accordance with the present disclosure.

FIG. 7 illustrates an example user interface 700 for debugging instructions executed by multiple actors that may be used in accordance with the present disclosure. User interface 700 may be run on client device 105, may be a part of a debugging application 110, and/or or may be in whole or in part implemented by a web-based service. In the example illustrated, interface 700 may include an actor area 705, an error condition area 715, an indication area 755 and other areas and/or items.

User interface 700 includes an actor area 705 that shows actors that are available for program debugging. The actor area 705 may allow selection of individual actors for association with one or more actor sub-sets, for example, to be associated with a debugging operation via selectable item 710. User interface 700 also includes an error condition area 715 that enables configuration of error conditions. In particular, error condition area 715 includes an error condition indication entry field 720, which allows a user to type text or otherwise input information associated with indication of an error conditions, such as expected actor states, defective actor states, associated inputs, events, conditions, and other information. Select associated actors item 730 may be used to select the actors for association with the error condition that is being configured. For example, a user may select item 730 and then select each actor (via actor area 705) that is to be associated with the error condition. As set forth above, in some examples, an error condition may be associated with an entire sub-set of actors, such as the first sub-set of actors shown in actor area 705. In other examples, an error condition may only be associated with certain individual actors. For example, an error condition may be associated with Actor 1 and Actor 4 but not with other actors.

Upon configuration of an error condition, selection of the set error condition item 740 may cause a record of the configured error condition and its selected associated actors to be stored. In some examples, once an error condition has been set, selection of the send error condition trigger instructions to associated actors item 750 may cause the debugging server to transmit the error condition trigger instructions to the associated actors. Upon completion of the configuration of the sub-set of actors and error condition(s), selection of the begin debug process item 795 may instruct the debugging server to coordinate with the actors 140 in the actor sub-set to begin execution of the collection of computer executable instructions.

User interface 700 may also provide a message processing indication area 755 that may provide for display and selection of sets of indications received from one or more actors 140. For example, upon receiving one or more sets of indications, user interface 700 may display each of the sets of indications 760, 770 in the message processing indication area 755. Each set of indications 760, 770 may include selectable message indications 762-765 and 772-765 that, upon selection, may display more details or information associated with each message. The additional details may include fields such as those shown in FIG. 3, including a message ID 310, a message description 315, a timestamp 320, indications associated with one or more actor states prior to processing the message by actor 325, and indications associated with one or more actor states subsequent to processing the message by actor 330, each of which is described in detail above in reference to FIG. 3.

In some examples, one or more indications within message processing indication area 755 may indicate that an error condition has been satisfied by one or more actors. For example, in FIG. 7, message indication 775 indicates that an error condition has been satisfied in association with processing of the corresponding message by Actor 2. This may, for example, cause execution of the message corresponding to indication 775 and previous messages be repeated.

Configure number of messages to repeat for debugging item 791 may allow a developer to configure for how many messages processing should be repeated. For example, a developer may specify that, when an error condition is satisfied by an actor, the last ten messages processed by the actor prior to satisfaction of the error condition should be repeated. Configure time period of messages to repeat for debugging item 791 may allow a developer to configure a time period within which processed messages should be repeated. For example, a developer may specify that, when an error condition is satisfied by an actor, all messages processed by the actor within a thirty second time period prior to satisfaction of the error condition should be repeated.

The developer may also indicate whether selected messages should be re-processed on either a separate (e.g., isolated) component or on a selected actor (e.g., the actor that satisfied the error condition). In particular, item 780 may be selected for re-processing on a separate component, while item 785 may be selected for re-processing on the selected actor.

Figure 8:
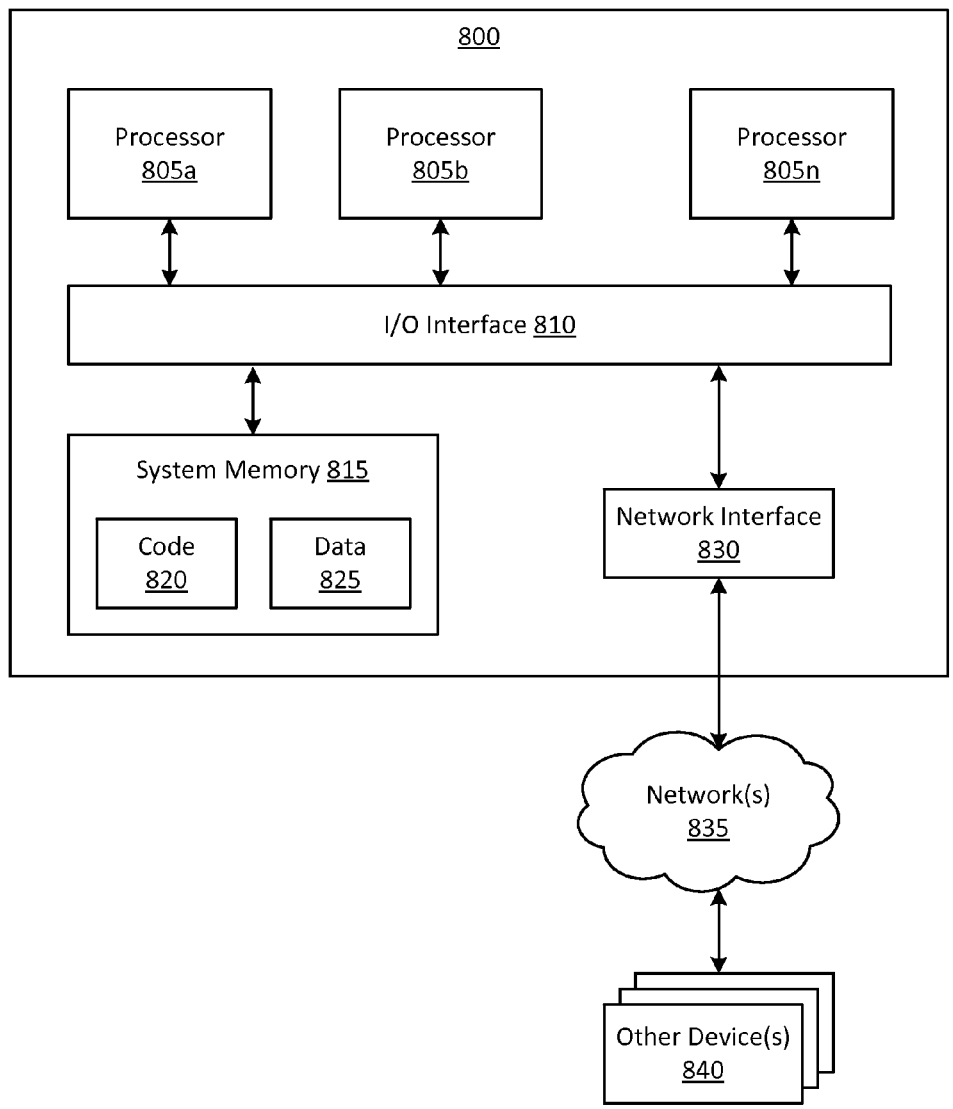
FIG. 8 is a diagram illustrating an example computing system that may be used in accordance with the present disclosure.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes. In at least some embodiments, one or more compute nodes that implement a portion or all of one or more of the technologies described herein may include or may be associated with a general-purpose computer system that includes or is configured to access one or more computer-accessible media. FIG. 8 depicts a general-purpose computer system that includes or is configured to perform debugging operations on a collection of instructions executable by multiple actors concernedly. In the illustrated embodiment, computing device 800 includes one or more processors 805*a*, 805*b* and/or 805*n* (which may be referred to herein singularly as "a processor 805" or in the plural as "the processors 805") coupled to a system memory 815 via an input/output (I/O) interface 810. Computing device 800 further includes a network interface 830 coupled to I/O interface 810.

In various embodiments, computing device 800 may be a uniprocessor system including one processor 805 or a multiprocessor system including several processors 805 (e.g., two, four, eight or another suitable number). Processors 805 may be any suitable processors capable of executing instructions. For example, in various embodiments, processors 805 may be general-purpose or embedded processors implementing any of a variety of instruction set architectures (ISAs), such as the x86, PowerPC, SPARC or MIPS ISAs or any other suitable ISA. In multiprocessor systems, each of processors 805 may commonly, but not necessarily, implement the same ISA.

System memory 815 may be configured to store instructions and data accessible by processor(s) 805. In various embodiments, system memory 815 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 815 as code 820 and data 825.

In one embodiment, I/O interface 810 may be configured to coordinate I/O traffic between processor 805, system memory 815 and any peripherals in the device, including network interface 830 or other peripheral interfaces. In some embodiments, I/O interface 810 may perform any necessary protocol, timing or other data transformations to convert data signals from one component (e.g., system memory 815) into a format suitable for use by another component (e.g., processor 805). In some embodiments, I/O interface 810 may include support for devices attached through various types of peripheral buses, such as a variant of the Peripheral Component Interconnect (PCI) bus standard or the Universal Serial Bus (USB) standard, for example. In some embodiments, the function of I/O interface 810 may be split into two or more separate components, such as a north bridge and a south bridge, for example. Also, in some embodiments some or all of the functionality of I/O interface 810, such as an interface to system memory 815, may be incorporated directly into processor 805.

Network interface 830 may be configured to allow data to be exchanged between computing device 800 and other device or devices 840 attached to a network or networks 835, such as other computer systems or devices, such as a debugging server 115, actors 140, etc., for example. In various embodiments, network interface 830 may support communication via any suitable wired or wireless general data networks, such as types of Ethernet networks, for example. Additionally, network interface 830 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 815 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 800 via I/O interface 810. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 800 as system memory 815 or another type of memory. Further, a computer-accessible medium may include transmission media or signals such as electrical, electromagnetic or digital signals conveyed via a communication medium, such as a network and/or a wireless link, such as those that may be implemented via network interface 830. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for debugging of a collection of instructions executed, at least in part, by a set of actors, the method comprising:

receiving an indication of an error condition associated with the collection of instructions;

receiving, from one or more actors in the set of actors, a set of indications comprising indications of messages processed by the one or more actors, indications of associated actor states prior to processing of the messages, and indications of associated actor states subsequent to processing of the messages;

determining that a first actor of the set of actors has satisfied the error condition;

identifying, based at least in part on the set of indications, one or more messages associated with satisfaction of the error condition; and sending instructions to repeat processing of the one or more messages associated with satisfaction of the error condition, wherein the processing of the one or more messages is repeated by the first actor, and wherein one or more other actors continue to process messages during repetition of the processing of the one or more messages by the first actor.

2. The method of claim 1, further comprising receiving an identification of a sub-set of actors from the set of actors, wherein the set of indications are received from the sub-set of actors.

3. The method of claim 1, wherein the error condition is satisfied based, at least in part, on a state of an actor after processing a message.

4. The method of claim 1, wherein the error condition is satisfied based, at least in part, on an actor state differing from an expected state.

5. The method of claim 1, wherein the one or more messages are identified based, at least in part, on a number of messages processed prior to satisfaction of the error condition or a time period prior to satisfaction of the error condition.

6. A computing system for debugging of a collection of instructions executed, at least in part, by a set of actors comprising:

one or more processors;

one or more memories having stored therein computer instructions that, upon execution by the one or more processors, cause at least the computing system to perform operations comprising:

receiving an indication of an error condition associated with the collection of instructions;

receiving, from one or more actors in the set of actors, a set of indications comprising indications of messages processed by the one or more actors, indications of associated actor states prior to processing of the messages, and indications of associated actor states subsequent to processing of the messages;

determining that a first actor of the set of actors has satisfied the error condition;

identifying, based at least in part on the set of indications, one or more messages associated with satisfaction of the error condition; and sending instructions to the first actor to repeat processing of the one or more messages associated with satisfaction of the error condition, wherein one or more other actors continue to process messages during repetition of the processing of the one or more messages by the first actor.

7. The computing system of claim 6, wherein the operations further comprise receiving an identification of a sub-set of actors from the set of actors, wherein the set of indications are received from the sub-set of actors.

8. The computing system of claim 6, wherein the error condition is satisfied based, at least in part, on an actor state differing from an expected state.

9. The computing system of claim 6, wherein the one or more messages are identified based, at least in part, on a configurable number of messages processed prior to satisfaction of the error condition or a configurable time period prior to satisfaction of the error condition.

10. One or more non-transitory computer-readable storage media having stored thereon instructions that, upon execution on at least one compute node, cause the at least one compute node to perform operations comprising:
   receiving an indication of an error condition associated with the collection of instructions;
   receiving, from one or more actors in the set of actors, a set of indications comprising indications of messages processed by the one or more actors, indications of associated actor states prior to processing of the messages, and indications of associated actor states subsequent to processing of the messages;
   determining that a first actor of the set of actors has satisfied the error condition;
   identifying, based at least in part on the set of indications, one or more messages associated with satisfaction of the error condition; and
   sending instructions to repeat processing of the one or more messages associated with satisfaction of the error condition, wherein the processing of the one or more messages is repeated by the first actor, and wherein one or more other actors continue to process messages during repetition of the processing of the one or more messages by the first actor.

11. The one or more non-transitory computer-readable storage media of claim 10, wherein the operations further comprise receiving an identification of a sub-set of actors from the set of actors, wherein the set of indications are received from the sub-set of actors.

12. The one or more non-transitory computer-readable storage media of claim 10, wherein the error condition is satisfied based, at least in part, on a state of an actor after processing a message.

13. The one or more non-transitory computer-readable storage media of claim 10, wherein the error condition is satisfied based, at least in part, on an actor state differing from an expected state.

14. The one or more non-transitory computer-readable storage media of claim 10, wherein the one or more messages are identified based, at least in part, on a number of messages processed prior to satisfaction of the error condition or a time period prior to satisfaction of the error condition.

* * * * *